United States Patent
Makhotin et al.

(10) Patent No.: US 10,685,343 B2
(45) Date of Patent: *Jun. 16, 2020

(54) TRUSTED INTERNAL INTERFACE

(71) Applicant: Visa International Service Association, San Francisco, CA (US)

(72) Inventors: Oleg Makhotin, Paris (FR); Trudy Hill, Foster City, CA (US); Erick Wong, Menlo Park, CA (US); Oleg Makarenko, Moscow (RU); Hao Ngo, San Jose, CA (US); Christian Aabye, Foster City, CA (US); William Alexander Thaw, San Mateo, CA (US)

(73) Assignee: Visa International Service Association, San Francisco, CA (US)

(*) Notice: Subject to any disclaimer, the term of this patent is extended or adjusted under 35 U.S.C. 154(b) by 260 days.

This patent is subject to a terminal disclaimer.

(21) Appl. No.: 15/810,710

(22) Filed: Nov. 13, 2017

(65) Prior Publication Data
US 2018/0068296 A1 Mar. 8, 2018

Related U.S. Application Data

(63) Continuation of application No. 14/611,091, filed on Jan. 30, 2015, now Pat. No. 9,846,873, which is a
(Continued)

(51) Int. Cl.
*G06Q 20/32* (2012.01)
*G06Q 20/20* (2012.01)
(Continued)

(52) U.S. Cl.
CPC ........... *G06Q 20/322* (2013.01); *G06Q 20/10* (2013.01); *G06Q 20/105* (2013.01); *G06Q 20/20* (2013.01);
(Continued)

(58) Field of Classification Search
None
See application file for complete search history.

(56) References Cited

U.S. PATENT DOCUMENTS 6,061,664 A   5/2000 Pieterse et al.
6,549,912 B1  4/2003 Chen
(Continued)

FOREIGN PATENT DOCUMENTS

CN   1591439 A      3/2005
CN   1655507 A  *   8/2005   ......... G06Q 20/3226
(Continued)

OTHER PUBLICATIONS

Lai, E., "U.S. Banks Are Slow to Embrace Mobile Commerce: Regulations, Costs Keep Most on the Sidelines for Now," Computerworld, vol. 40, No. 36, p. 18, Sep. 4, 2006. (Year: 2006).*
(Continued)

*Primary Examiner* — Nicholas D Rosen
(74) *Attorney, Agent, or Firm* — Kilpatrick Townsend & Stockton LLP

(57) ABSTRACT

An interface and device architecture for a payment device. An interface between a payment application installed in a payment device and one or more value-add applications (such as loyalty programs, transit applications, etc.) that are also installed in the payment device. The API or interface design permits communications and data transfer between the payment application and one or more value-add applications. This reduces (and in some cases may prevent) the need for back-end server processing of data that may be relevant to both a payment transaction and to a function of the value-add application. Similarly, the same or another API or interface may enable communications and data transfer between a value-add application and the payment application.

20 Claims, 8 Drawing Sheets

Related U.S. Application Data continuation of application No. 13/658,935, filed on Oct. 24, 2012, now Pat. No. 9,092,769, which is a continuation of application No. 13/149,553, filed on May 31, 2011, now Pat. No. 8,321,345.

(60) Provisional application No. 61/350,719, filed on Jun. 2, 2010.

(51) Int. Cl.

| | | |
|---|---|---|
| *G06Q 20/30* | (2012.01) | |
| *G06Q 20/36* | (2012.01) | |
| *G06Q 20/10* | (2012.01) | |
| *G06Q 20/34* | (2012.01) | |
| *G06Q 30/06* | (2012.01) | |
| *G07F 7/10* | (2006.01) | |
| *G06Q 30/02* | (2012.01) | |

(52) U.S. Cl.
CPC .......... *G06Q 20/202* (2013.01); *G06Q 20/32* (2013.01); *G06Q 20/325* (2013.01); *G06Q 20/327* (2013.01); *G06Q 20/3226* (2013.01); *G06Q 20/3229* (2013.01); *G06Q 20/3278* (2013.01); *G06Q 20/34* (2013.01); *G06Q 20/357* (2013.01); *G06Q 20/3563* (2013.01); *G06Q 20/3574* (2013.01); *G06Q 30/0226* (2013.01); *G06Q 30/0641* (2013.01); *G07F 7/10* (2013.01)

(56) References Cited

U.S. PATENT DOCUMENTS

| | | | |
|---|---|---|---|
| 6,889,198 | B2 | 5/2005 | Kawan |
| 7,194,438 | B2 | 3/2007 | Sovio et al. |
| 7,360,691 | B2 | 4/2008 | Takayama |
| 7,512,567 | B2 | 3/2009 | Bemmel et al. |
| 7,527,208 | B2 | 5/2009 | Hammad et al. |
| 7,716,080 | B2 | 5/2010 | Postrel |
| 7,729,986 | B1 | 6/2010 | Hoffman et al. |
| 7,761,378 | B2 | 7/2010 | Postrel |
| 7,780,080 | B2 | 8/2010 | Owen et al. |
| 8,095,463 | B1 | 1/2012 | Hartmaier |
| 8,204,828 | B1 | 6/2012 | Kuite et al. |
| 8,215,560 | B2 | 7/2012 | Granucci et al. |
| 8,321,345 | B2 | 11/2012 | Makhotin et al. |
| 8,733,663 | B2 | 5/2014 | Hammad et al. |
| 9,092,769 | B2 | 7/2015 | Makhotin et al. |
| 9,846,873 | B2 * | 12/2017 | Makhotin ............. G06Q 20/10 |
| 2002/0032649 | A1 | 3/2002 | Selvarajan |
| 2002/0065716 | A1 | 5/2002 | Kuschill |
| 2002/0152106 | A1 | 10/2002 | Stoxen et al. |
| 2003/0078882 | A1 | 4/2003 | Sukeda et al. |
| 2004/0133460 | A1 | 7/2004 | Berlin et al. |
| 2004/0139021 | A1 | 7/2004 | Reed et al. |
| 2005/0015346 | A1 | 1/2005 | Rinne |
| 2005/0021400 | A1 | 1/2005 | Postrel |
| 2005/0173518 | A1 | 8/2005 | Takayama |
| 2007/0078761 | A1 | 4/2007 | Kagan et al. |
| 2007/0099679 | A1 | 5/2007 | Saarisalo |
| 2008/0040265 | A1 | 2/2008 | Rackley, III et al. |
| 2008/0128513 | A1 | 6/2008 | Hammad |
| 2008/0195494 | A1 | 8/2008 | Postrel |
| 2008/0208681 | A1 | 8/2008 | Hammad et al. |
| 2009/0081989 | A1 | 3/2009 | Wuhrer |
| 2009/0239512 | A1* | 9/2009 | Hammad ............... G06Q 20/12 455/414.1 |
| 2012/0022973 | A1 | 1/2012 | Makhotin et al. |
| 2013/0046588 | A1 | 2/2013 | Makhotin et al. |

FOREIGN PATENT DOCUMENTS

| | | | |
|---|---|---|---|
| CN | 101258509 A | * | 9/2008 |
| CN | 101364329 A | | 2/2009 |
| CN | 101542540 A | | 9/2009 |
| JP | 2006/113747 A | | 4/2006 |
| KR | 10-2005-0062003 A | | 6/2005 |
| KR | 10-2006-0037214 A | | 5/2006 |
| KR | 10-2006-0065900 A | | 6/2006 |
| KR | 10-2006-0080781 A | | 7/2006 |
| KR | 10-0656101 A | | 12/2006 |
| RU | 2298225 C2 | | 4/2007 |
| WO | 2001009853 A1 | | 2/2001 |
| WO | 2007008915 A2 | | 1/2007 |
| WO | 2008039796 A2 | | 4/2008 |
| WO | 2010033116 A1 | | 3/2010 |
| WO | 2010033967 A1 | | 3/2010 |

OTHER PUBLICATIONS

International Preliminary Report on Patentability, dated Dec. 4, 2012, , from PCT Patent Application No. PCT/US2011/038817 , 7 pages. (Year: 2012).*

Examination Report, dated May 29, 2019, in Indian Patent Application No. 7772/CHENP/2012, 6 pages.

Balaban, D., "Is the World Ready for Contactless Payment?" Card Technology, May 1, 2006.

Palmer, T.C., "Token-less MBTA System May Be on Horizon—Again," Boston Globe, third edition, Metro/Region section, p. B2, Jun. 24, 2001.

Ramstack, T., "Lockheed Will Run SmarTrip Services," Washington Times, p. C11, Dec. 16, 2000.

Search/Examination Report and Written Opinion, dated Dec. 28, 2011 from International Patent Application No. PCT/US2011/038817, 9 pages.

Office Action, dated Jun. 21, 2012, in U.S. Appl. No. 13/149,553, filed May 31, 2011, 12 pages.

Notice of Allowance, dated Jul. 25, 2012, in U.S. Appl. No. 13/149,553, filed May 31, 2011, 11 pages.

Notice of Allowance, dated Apr. 16, 2015, in U.S. Appl. No. 13/658,935, filed Oct. 24, 2012, 11 pages.

Notice of Acceptance dated Apr. 28, 2015 for Australian Patent Application No. 2011261490, 2 pages.

Zhang, China Internet, Issue 5, pp. 52-55 (2010).

Xu, Business Management Review, Issue 8, pp. 80-81 (2009).

Chinese Office Action and Search Report dated Jun. 30, 2015 for Chinese Patent Application No. 201180014109.5, with English translation, 13 pages.

Third Office Action, dated Aug. 31, 2016, in Chinese Patent Application No. 201180014109.5, including English translation, 20 pages.

Russian Office Action dated Sep. 30, 2015 for Russian Patent Application No. 2012139267, with English translation, 7 pages.

Decision on Grant in RU Application No. 2012139267, dated Feb. 15, 2016.

* cited by examiner

TRUSTED INTERNAL INTERFACE

CROSS-REFERENCES TO RELATED APPLICATIONS

This application is a continuation of U.S. patent application Ser. No. 14/611,091, filed Jan. 30, 2015, which is a continuation of U.S. patent application Ser. No. 13/658,935, filed Oct. 24, 2012, now U.S. Pat. No. 9,092,769, which is a continuation of U.S. patent application Ser. No. 13/149,553, filed May. 31, 2011, now U.S. Pat. No. 8,321,345, which claims the benefit of and priority to U.S. Provisional Patent Application No. 61/350,719, filed Jun. 2, 2010, the entire contents of all of which are incorporated herein by reference for all purposes.

BACKGROUND

Embodiments of the present invention are directed to systems, apparatuses and methods for conducting payment transactions, and more specifically, to an internal interface for chip cards and other payment devices, such as mobile phones, that may include a payment application to enable communication and data transfer between the payment application and other applications installed on the card or device. Embodiments of the invention permit loyalty, transit, and other value-add applications installed on a payment card or payment device to exchange data with the payment application directly, instead of relying upon remote back-end data processing support.

Consumer payment devices such credit cards, debit cards, or contactless chips embedded in other devices are used by millions of people worldwide to facilitate various types of commercial transactions. In a typical transaction involving the purchase of a product or service at a merchant location, the payment device is presented at a point of sale terminal ("POS terminal") located at a merchant's place of business. A consumer may also initiate a payment transaction by providing payment data from a remote location to a merchant over a network such as the Internet. Transactions of this type are typically initiated using a computing device such as a personal computer or laptop computer. Transactions may also be initiated by using a mobile device such as a cell phone or personal data assistant (PDA) that communicates with a merchant or service provider directly or indirectly over a wireless network. Transactions in which the consumer is not in the same physical location as a merchant, and hence where a payment device is not physically presented to the merchant, are termed "card not present" transactions.

A consumer payment device such as a smart card, contactless chip embedded in another device, or mobile phone typically utilizes a payment application to enable a consumer to conduct payment transactions. In addition to the payment application, the payment device may also include one or more other applications, such as loyalty program applications, transit applications, etc. These applications may provide a consumer with other desired functionality, such as the ability to utilize a transit system or manage their loyalty account with a hotel, car rental agency, etc. In some situations, interaction or data exchange between the payment application and one of the other applications may be needed to update a counter, process a purchase or exchange of loyalty points as part of a transaction, provide payment for use of a transit system, etc. In current payment devices, the resident applications are independent and such interactions or data exchanges typically require remote processing by a back-end server operated by an appropriate entity (such as the operator of the transit system or manager of a loyalty program). This is inefficient and can cause delays in the processing of transactions if multiple remote data processing operations are required to complete a transaction.

What is desired are a system, apparatus and method for enabling communication and data transfer between the applications installed in a payment device, specifically between a payment application and another installed application or functional element. Embodiments of the invention address these problems and other problems individually and collectively.

SUMMARY

Embodiments of the present invention are directed to a system, apparatus, and method for enabling the communication and secure transfer of data between applications installed in a payment device, such as a smart card, mobile phone, or device with an embedded chip. The present invention permits the local (i.e., within the payment device) transfer of data between applications installed in the payment device by providing one or more interfaces between an installed payment application and each additional application. This permits data to be transferred between the payment application and additional applications, and also the transfer of data between the payment application, additional applications and devices and networks that can access those applications. Embodiments of the present invention provide a secure mechanism for the exchange of data between a payment application and multiple value-add applications that are also installed in a payment device. Embodiments of the present invention also provide a mechanism for the sharing of transaction data and value-add application data between the payment network and one or more value-add application networks; this may enable new products and services for consumers and provide additional opportunities for data mining by other entities of those networks.

In some embodiments, the invention relates to an interface between a payment application installed in a payment device and one or more value-add applications (such as loyalty programs, transit applications, etc.) that are also installed in the payment device. The invention consists of an API or interface design that permits communications and data transfer between the payment application and one or more value-add applications. This reduces (and in some cases may prevent) the need for back-end server processing of data that may be relevant to both a payment transaction and to a function of the value-add application. Similarly, the same or another API or interface may enable communications and data transfer between a value-add application and the payment application. Use of the application may enable a payment processor or other entity responsible for managing the payment application to extend the data processing services it provides to the value-add applications and the operators of certain value-add programs. This may enable new service or products for consumers as well as more efficient transactions in which payment transaction data and value-add application data are utilized.

Other objects and advantages of the present invention will be apparent to one of ordinary skill in the art upon review of the detailed description of the present invention and the included figures.

DETAILED DESCRIPTION

Figure 1:
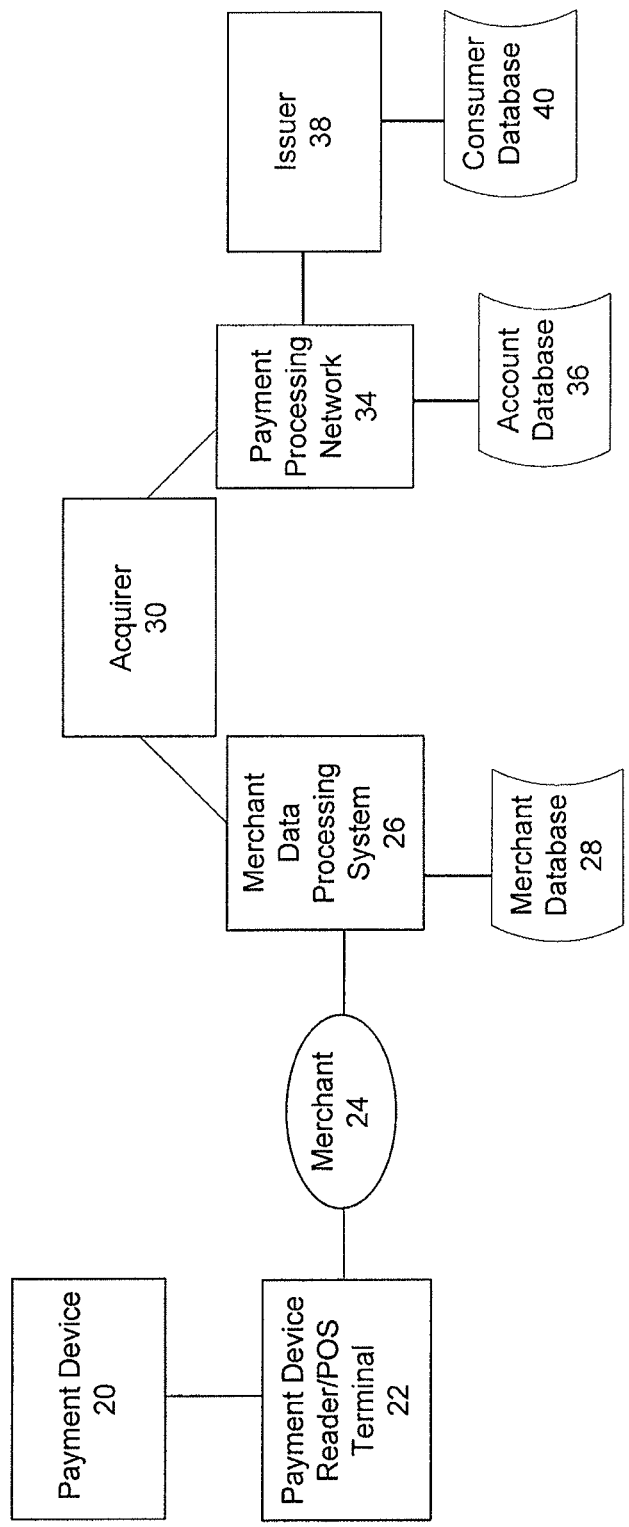
FIG. 1 is a block diagram illustrating a transaction processing system that may be used with some embodiments of the present invention.

The included Appendix to this application is to be considered part of the present application and is incorporated by reference in its entirety for all purposes.

Embodiments of the present invention are typically implemented in the context of a payment transaction system, and specifically, in the context of a payment device used to conduct a payment transaction. In embodiments of the present invention, an exemplary payment device may include, but is not limited to, a smart card that includes an embedded chip, a mobile device such as a phone or key fob that includes an embedded chip, a contactless chip embedded in a suitable portable device, etc. In a typical payment transaction, a consumer provides a payment account or payment device identifier to a merchant or service provider. According to an embodiment, the payment account or payment device identifier may be provided in the form of a card (e.g., a smart card with an embedded chip that communicates with a point of sale terminal or device reader using a contact or contactless mode), or payment account information may be provided using a mobile phone or similar device in which is embedded a chip that functions (or enables the device to function) as a payment device.

Embodiments of the present invention permit the local (i.e., within the payment device) transfer of data between applications installed in the payment device by providing one or more interfaces between an installed payment application and each additional value-add application installed in the device. This permits data to be transferred between the payment application and additional value-add applications, and also the transfer of data between the payment application, additional value-add applications and devices and networks that can access those applications. Embodiments of the present invention facilitate use of the payment device to conduct payment and value-add transactions in a manner that is convenient for the consumer, while enabling an issuer, payment processor, or other entity that manages the payment application to exchange data with value-add operators that manage value-add applications.

For example, during a payment transaction, a value-add application that is installed on the mobile device and that is managed by a value-add operator may provide value-add data to a payment application that is also installed on the mobile device and that is conducting the payment transaction. The value-add data may be passed from the value-add application to the payment application via a trusted interface that couples the applications. Upon receiving the value-add data, the payment application may transmit the value-add data together with payment data via a payment processing network to a payment processor, issuer, or other entity that manages the payment application. Thus, the payment processor, issuer, or other entity that manages the payment application receives value-add data from the value-add application by way of the trusted interface that couples the payment application to the value-add application on the payment device, instead of having to integrate its backend system with the backend system of the value-add operator. Also, for example, during a value-add transaction, the payment application may provide payment data to a value-add application via a trusted interface that couples the payment application to the value-add application. The value-add application may then transmit, via a proprietary value-add network, the payment data together with value-add data to a value-add operator, such as a transit or loyalty program operator, which may then send the payment data together with value-add data to an issuer. According to an embodiment, upon receiving payment data from the payment application, the payment application may authorize the payment transaction offline. In this case, the value-add application would not need to send the payment data to value-add operator and/or the issuer and could instead send only clearing information. For example, clearing records as defined in BASE II may be forwarded to the issuer to settle the payment.

An example will now be provided in which a value-add application installed on a payment device requests payment data from a payment application that is also installed on the payment device and that is communicatively coupled to the value-add application via a trusted interface. Upon request from the value-add application, the payment application transmits payment data to the value-add application via the trusted interface. Then, the value-add application sends the payment data to the value-add operator via the value-add operator's proprietary network. Thus, the value-add application obtains payment data directly from the payment application within the payment device, without the need of backend integration.

According to this example, the value-add application is a transit application managed by a transit operator. The transit application may be, for example, a CALYPSO™ or MIFARE™ application that is implemented as a Java applet and loaded onto the payment device. When boarding a bus or train, a transit rider presents the payment device to a transit ticket validator on the bus or at a transit gate, thereby activating the transit application on the payment device and causing the transit application to engage the transit ticket validator in a ticket transaction (e.g., near field communication technology may be used to facilitate communication between the payment device and the transit ticket validator). During the ticket transaction, the transit application on the payment device requests payment data (e.g., authorization request cryptogram (ARQC), primary account number (PAN), etc.) from the payment application on the payment device. The payment application sends the payment data to the transit application via the trusted interface. The transit application then sends the payment data together with transit data to the transit ticket validator, which sends the payment data and the transit data to the transit operator via a proprietary transit network. Thus, the proprietary transit network is used to send payment data (in addition to transit data) to the transit operator. The transit operator may then use the payment data to request a payment transaction. For example, the transit operator can request a payment transaction by sending the payment data to an acquirer bank, which sends the payment data to the appropriate issuer bank through a payment processing network.

Further, according to this example, the payment transaction may be performed offline authorized by the payment application within the payment device. In the case of an offline payment, the transit application would not need to send the payment data to transit system via the transit validator, but could instead send only the clearing information (e.g., clearing records as defined in BASE II). The transit system may then forward the clearing information to the issuer to settle the payment. Transit applications, such as MIFARE™, have enough proprietary fields and can pass data minimally required to perform authorization and clearing. Such fields include the payment amount, PAN/ED and ARQC. An offline payment indicates that the offline counters should be reported to the issuer for pre-authorized solutions.

Another example will now be provided. In this example, a payment application installed on a payment device requests value-add data from a value-add application that is also installed on the payment device and that is communicatively coupled to the payment application via a trusted interface. Upon request from the payment application, the value-add application transmits value-add data to the payment application via the trusted interface. Then, the payment application sends the value-add data together with payment data to a payment processing network, which may send the data to an issuer bank, an acquirer bank, the value-add operator, etc. Thus, the payment application obtains value-add data directly from the value-add application within the payment device and the payment processing network is used to transmit value-add data in addition to payment data. This eliminates the need for backend integration.

According to this example, the value-add application installed on the payment device is a transit application that is managed by a transit operator. In operation, when a transit rider wants to purchase a transit ticket, the transit rider presents the payment device to an acceptance device, such as a point of sale terminal, of the transit operator and thereby causes the payment application of the payment device to activate and initiate a payment transaction with the acceptance device of the transit operator (e.g., near field communication technology may be used to facilitate communication between the payment device and the acceptance device). During such payment transaction, the payment application, which is installed on the payment device, requests ticketing data from the transit application, which is also installed on the payment device. Upon receiving ticketing data from the transit application, the payment application sends the ticketing data together with payment data to the acceptance device of the transit operator, which sends the payment data together with the ticketing data to the payment processing network. Thus, the payment processing network is used to transmit ticketing data as well as payment data. The ticketing data may be sent through the payment processing network in the form of IDD (Issuer Discretionary Data). Further, for example, the data may be sent via the payment processing network to the transit operator, either directly or via an issuing bank.

Yet another example will now be provided. In this example, a payment application installed on a payment device sends payment transaction data to a value-add application that is also installed on the payment device and that is communicatively coupled to the payment application via a trusted interface. The value-add application then makes a value-add calculation based on the payment transaction data and sends value-add data, which includes the results of the calculation, to the payment application via the trusted interface. Then, the payment application sends the value-add data together with payment data to a payment processing network, which may send the data to an issuer bank, an acquirer bank, the value-add operator, etc.

According to this example, the value-add application is a loyalty application that is managed by a loyalty operator, such as an airline, retail store, etc. In operation, when a consumer uses the payment device to purchase an item or service (e.g., airline ticket, item from retail store, etc.) that is subject to the loyalty program associated with the loyalty application, the consumer presents the payment device to an acceptance device, such as a point of sale terminal, and thereby causes the payment application of the payment device to initiate a payment transaction with the acceptance device (e.g., near field communication technology may be used to facilitate communication between the payment device and the acceptance device). During the payment transaction, the payment application, which is installed on the payment device, sends payment transaction data (e.g., purchase amount, item SKU numbers, etc.) to the loyalty application, which makes a loyalty calculation (e.g., applies loyalty points to transaction, etc.). The loyalty application then sends, via the trusted interface, loyalty data, which includes the results of the loyalty calculation, to the payment application. The payment application then sends the loyalty data together with payment data to the acceptance device, which sends the payment data together with the loyalty data to the payment processing network. Thus, the payment processing network is used to transmit loyalty data as well as payment data. The payment processing network may send the data to an issuer bank, which sends the data to the loyalty operator. This reduces the amount of effort needed for integration of backend systems.

Prior to discussing the specific embodiments of the invention, a further description of some terms can be provided for a better understanding of embodiments of the invention.

A "Payment Processing Network" may include data processing subsystems, networks, and other means of implementing operations used to support and deliver authorization services, exception file services, and clearing and settlement services for payment transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes transaction authorization requests and a Base II system which performs transaction clearing and settlement services.

An "Acquirer" is typically a business entity (e.g., a commercial bank) that has a business relationship with a particular merchant.

An "Issuer" is typically a business entity (e.g., a bank) which issues a payment device (such as a credit or debit card) to a consumer. Some entities may perform both Issuer and Acquirer functions.

A "Payment Account" may include any suitable account that holds funds that may be withdrawn, transferred, or otherwise used to make payments. Examples of Payment Accounts include checking accounts, deposit accounts, etc.

"Payment Data" may include data that provides information about a payment account. Examples of payment data include a payment account numbers, routing transit numbers, balance information, transaction data, PIN data, communication protocol data for use in point of sale environments, etc.

A "Payment Device" may include is a device that a user may use to conduct a payment transaction. Examples of payment devices include debit cards, credit cards, smart cards, mobile devices such as mobile phones, and other suitable devices.

A "Payment Application" may be an application that is installed on a payment device and that enables a user to make a payment for a transaction, where the transaction is wholly or partially conducted using the payment device. According to some embodiment, a payment application installed on a payment device enables the payment device to function as an electronic wallet for commerce transactions.

A "Value-Add Application" may be any application installed on a payment device and designed to help a user to perform singular or multiple related specific tasks. Examples of value-add applications may include a transit application that provides a user with the ability to use a transit system, a loyalty program application that provides a user with the ability to manage a loyalty account with an issuer, a hotel, an airline, a car rental agency, any suitable entity that has or is affiliated with a loyalty program, etc.

An "Interface" may be hardware and/or software that enables interaction between two or more components. An example interface includes an application programming interface (API) that facilitates interaction between different software programs.

An "External Communications Network" may be any network know in the art and may use any networking technology known in the art to transmit data. Examples of external communication networks include wide-area networks, local-area networks, personal-area networks, wireless networks, cellular networks, payment processing networks, etc. Examples of network technology include Near-Field Communication (NFC) technologies, Transmission Control Protocol/Internet Protocol (TCP/IP), Ethernet, Fiber Distributed Data Interface (FDDI), token bus, or token ring networks.

A "Transit Application" may be any suitable application that provides a user with the ability to use or otherwise interact with a transit system. For example, a transit application may be installed on a payment device and enable a user to purchase and redeem transit rides. Accordingly, in some embodiments, the transit application installed on a payment device along with a payment application enable the payment device to function as both an electronic wallet for commerce transactions and as a transit system token, for access to transit services.

A "Transit Acceptance Network" may be any suitable network configured to, among other things, collect and redeem transit fare. A transit acceptance network, for example, may collect and redeem transit fare via card not present transactions, contactless payment transactions, card swipe transactions, etc. For example, the transit acceptance network may include transit acceptance devices or terminals that collect fare from riders' payment devices via contactless payment transactions and card swipe transactions.

A "transit operator" may be an entity such as a municipality, municipal corporation, or any other company, authority, or organization that operates a transit system.

"Transit information" may include data relevant to transit systems and services. Examples of transit data may include access control data (keys, passwords, identification data) or data required for fare calculations (rates, historical data on system use), fare amounts, trip counters, etc.

A "Loyalty Program" may include any program that rewards loyal purchasing behavior. For example, such programs may include marketing programs that enable a user to acquire credits/points through purchasing products and services and redeem those credits/points to reduce the costs purchases, to receive discounts, rebates, or refunds, to receive awards, gifts, statuses, benefits, etc.

A "Loyalty Application" may be any suitable application that provides a user with the ability to use one or more loyalty programs. For example, a loyalty application may be installed on a payment device and enable a user to acquire and redeem loyalty points/credits using the payment device.

"Loyalty Information" may include any suitable data that may be relevant to a loyalty program. Examples of such information include loyalty points, loyalty credit, loyalty value, loyalty program rules, terms and conditions, discounts, rebates, or refunds, to receive awards, gifts, statuses, benefits, etc.

A "Loyalty Operator" may be an entity that operates, manages, or administers, or is otherwise involved in the operation, management, or administration of a loyalty program. Examples of loyalty operators include supermarkets, airlines, restaurants, issuers, retailers, hotels, etc.

FIG. 1 is a block diagram illustrating a transaction processing system 10 that may be used with some embodiments of the present invention. Typically, an electronic payment transaction is authorized if the consumer conducting the transaction is properly authenticated (i.e., their identity and their valid use of a payment account is verified) and if the consumer has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized.

FIG. 1 illustrates the primary functional elements that are typically involved in processing a payment transaction and in the authorization process for such a transaction. As shown in FIG. 1, in a typical payment transaction, a consumer wishing to purchase a good or service from a merchant uses a portable payment device 20 to provide payment transaction data that may be used as part of a consumer authentication or transaction authorization process. Portable payment device 20 may be a debit card, credit card, smart card, mobile device containing a contactless chip, or other suitable form of device.

The portable payment device is presented to a device reader or point of sale (POS) terminal 22 which is able to access data stored on or within the payment device. In embodiments, the portable payment device communicates account/payment data to the merchant 24 via a "card not present" transaction over a communications network, such as a cellular network, the Internet, etc. The account data (as well as any required consumer data) is communicated to the merchant 24 and ultimately to the merchant's transaction/ data processing system 26. As part of the authentication or authorization process performed by the merchant, merchant transaction processing system 26 may access merchant database 28, which typically stores data regarding the customer/consumer/user (as the result of a registration process with the merchant, for example), the consumer's payment device, and the consumer's transaction history with the merchant. Merchant transaction processing system 26 typically communicates with acquirer 30 (which manages the merchant's accounts) as part of the overall authentication or authorization process. Merchant transaction processing system 26 and/or acquirer 30 provide data to payment processing network 34, which among other functions, participates in the clearance and settlement processes that are part of the overall transaction processing.

Communication and data transfer between merchant transaction processing system 26 and payment processing network 34 is typically by means of an intermediary, such as acquirer 30. As part of the consumer authentication or transaction authorization process, payment processing network 34 may access account database 36, which typically contains information regarding the consumer's account payment history, chargeback or transaction dispute history, credit worthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

In standard operation, an authorization request message is created during a consumer purchase of a good or service at a point of sale (POS) using a portable payment device. In some embodiments, the portable payment device may be a wireless phone or personal digital assistant that incorporates a contactless card or chip. The contactless card or chip may communicate with the point of sale terminal using a near field communications (NFC) capability. The authorization request message is typically sent from the device reader/POS terminal 22 through the merchant's data processing system 26 to the merchant's acquirer 30, to a payment processing network 34, and then to an issuer 38. An authorization request message can include a request for authorization to conduct an electronic payment transaction and data relevant to determining if the request should be granted. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the Issuer receives the authorization request message, the Issuer determines if the transaction should be authorized and sends an authorization response message back to the payment processing network to indicate whether or not the current transaction is authorized. The payment processing system then forwards the authorization response message to the acquirer. The acquirer then sends the response message to the merchant. The merchant is thus made aware of whether the Issuer has authorized the transaction, and hence whether the transaction can be completed.

At a later time, a clearance and settlement process may be conducted by elements of the payment/transaction processing system depicted in FIG. 1. A clearance process involves exchanging financial details between an Acquirer and an Issuer to facilitate posting a transaction to a consumer's account and reconciling the consumer's settlement position. Clearance and settlement can occur simultaneously or as separate processes.

Payment processing network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment data (e.g., a BIN number, account number, etc.) and a near field communications (NFC) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g., a credit card), or stored value functions (e.g., a stored value or prepaid card).

In embodiments of the invention that include a contactless element (e.g., a contactless chip and near field communications data transfer element) embedded within a wireless mobile phone or similar device, the contactless element can communicate with a merchant's device reader or point of sale terminal using a short range communication method, such as a NFC technologies. Examples of such NFC technologies or similar short range communications technologies include ISO standard 14443, RFID, Bluetooth™ and Infra-red communications methods.

Figure 2:
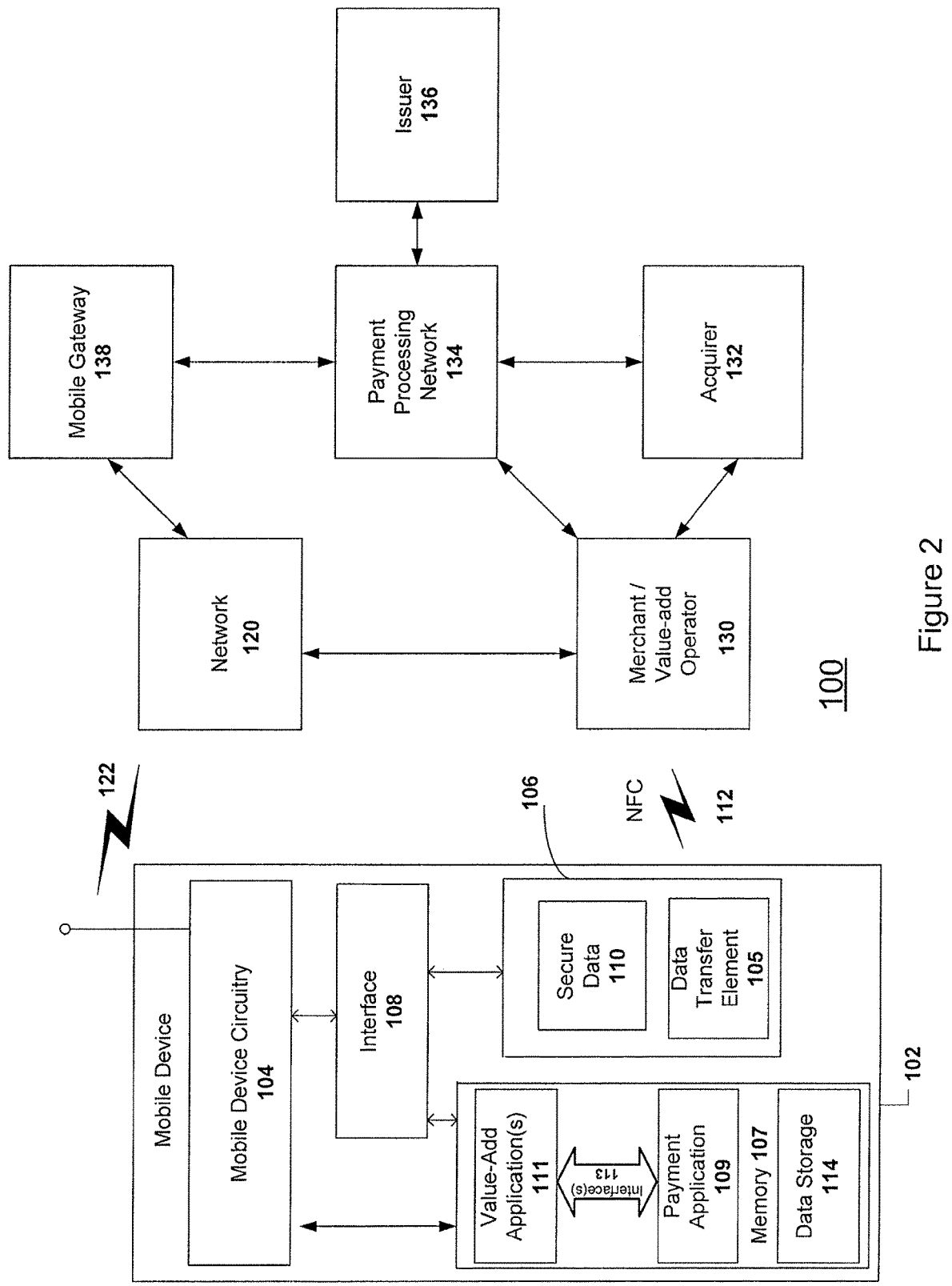
FIG. 2 is a functional block diagram illustrating the primary components of a system for initiating or facilitating a payment and value-add transactions, in accordance with some embodiments of the present invention.

FIG. 2 is a functional block diagram illustrating the primary components of a system 100 for using a payment device to conduct payment transactions in which a payment application and value-add applications installed on the payment device exchange data via an interface, in accordance with some embodiments of the present invention. As shown in FIG. 2, the system 100 includes a mobile payment device 102 having wireless communications capabilities 122. Mobile payment device 102 may be a wireless mobile telephone, PDA, laptop computer, pager, etc. In a typical embodiment, mobile payment device 102 is a cell phone, although as noted, implementation of the present invention is not limited to this embodiment as the mobile payment device may take any suitable form convenient for use by a consumer. Naturally, if the mobile device is not a cell phone or similar form of wireless communications device, then the mobile payment device may not be capable of communication using a mobile, wireless or cellular network. In the case of a cell phone as the mobile payment device 102, the device includes mobile device (cell phone) circuitry 104 that enables certain of the telephony functions. For example, network 120 may be a mobile or cellular network and the mobile device circuitry 104 may enable the mobile payment device 102 to access the mobile or cellular network via the wireless communications capabilities 122. Also, for example, the network 120 may be the Internet and the mobile device circuitry 104 may enable the mobile payment device 102 to access the Internet via the wireless communications capabilities 122. For example, the wireless communications capabilities 122 may be a WiFi network that connects the mobile payment device 102 to the Internet 120.

Mobile payment device 102 further includes a contactless element 106, typically implemented in the form of a semiconductor chip. Contactless element 106 may include a secure data storage element 110, although secure data storage element 110 may also be implemented as a separate element from contactless element 106. Contactless element 106 includes a near field communications (NFC) data transfer (e.g., data transmission) element 105, such as an antenna or transducer. As will be described, the near field communications capability permits a device reader or point of sale terminal to exchange data with (or perform operations on) contactless element 106 as part of, or in preparation for, a payment transaction. In some embodiments, contactless element 106 may be embedded within and integrated with the elements of mobile payment device 102. In such a case, data or control instructions may optionally be transmitted via cellular network 120 and be exchanged with, or applied to, contactless element 106 by means of interface 108. In that situation, the interface 108 functions to permit the exchange of data and/or control instructions between mobile device circuitry 104 (and hence the cellular network) and contactless element 106. Thus, contactless element 106 may include data storage capability in the form of a memory or secure data storage 110 that may be accessed via a near field communications capability or interface 108 to permit the implementation of data read, write, and erase functions, for example.

Secure data storage 110 may be used by mobile payment device 102 to store operating parameters or other data utilized in the operation of the device. Secure data storage 110 may also be used to store other data for which enhanced security is desired, for example, transaction data, personal account data, identification data, authentication data, access control data for an application or device function, etc. As mentioned, secure data storage 110 may be implemented in the form of a chip that is separate and apart from contactless element 106, or alternatively, may be a section of memory in a chip that forms part of contactless element 106. Note also that the secure data storage and/or contactless element contained within the mobile payment device may be a removable element or may be integrated within the mobile device. Examples of removable elements include SIM cards, flash memory cards, and other suitable devices.

Mobile payment device 102 may include a payment application 109 and one or more value-add applications 111, where the payment application 109 is coupled to the value-add application(s) 111 by trusted interface(s) 113. Although one payment application, one value-add application, and one trusted interface are illustrated, it should be appreciated that any number of these components may be provided. The payment and value-add applications 109 and 111 and the trusted interface 113 may be implemented in the form of one or more of software, firmware, or hardware. According to an embodiment, the payment application 109 may enable a consumer to make a payment for a transaction, where the transaction is wholly or partially conducted using the mobile device 102. The value-add applications 111 may represent processes or operations that are dedicated to functions that provide added value for the consumer and which are not part of the standard operation of the mobile device (i.e., not part of enabling the standard telephony functions, for example).

The payment application 109, which may be VMPA (Visa Mobile Payment Application), can validate a DDA-like signature from the value-add applications 111 in each transaction where a payment transaction is required. Thus, the payment application 109 validates that the value-add application 111 is "trusted" and then provides the necessary payment data, such as PAN, ED, amount and ARQC to the value-add application. According to an embodiment, the value-add application is a transit application, such as MIFARE™, and is configured to send payment data using its proprietary fields and proprietary transit network, which has an interface with an acquirer that sends the payment data to an issuer. If the issuer declines the payment, then the transit operator adds the payment device to a black list.

The value-add application 111 may be, for example, a transit application that enables consumers to use a transit system. For example, the transit application may enable consumers to use the mobile payment device 102 to purchase, manage, and redeem transit rides. Also, for example, the value-add application 111 may be a loyalty program application that enables consumers to manage a loyalty program. For example, the loyalty program application may enable consumers to acquire, manage, and/or redeem loyalty points/credits.

As shown in FIG. 2, the payment application 109 may exchange data with the value-add application(s) 111 via the trusted interface(s) 113. Further, the payment and value-add applications 109 and 111 may exchange information with the secure data storage 110 (via interface 108) and may also be capable of exchanging data with mobile device circuitry 104. In such an example, the secure data storage 110 may contain authentication data, consumer identification data, transaction record data, account balance data, etc. The payment and value-add applications 109 and 111 are typically stored as a set of executable instructions in memory 107, which may also include data storage 114. A processor accesses memory 107 to load and unload the instructions and data as needed to execute the instructions to perform the functions of the applications.

Contactless element 106 is capable of transferring and receiving data using data transfer element 105 which implements a near field communications capability 112, typically in accordance with a standardized protocol or data transfer mechanism (e.g., ISO 14443/NFC). Near field communications capability 112 is a short-range communications capability, such as RFID, Bluetooth™, infra-red, or other data transfer capability that can be used to exchange data between the mobile device 102 and a device reader, which is typically located at a merchant or a value-add operator 130. For example, the device reader may be a point of sale terminal at a merchant, an acceptance device at value-add operator, such as a transit system, a loyalty program operator, etc. Thus, in some embodiments, mobile device 102 is capable of communicating and transferring data and/or control instructions via both cellular 122 and near field communications capability 112. It should also be appreciated that the mobile device 102 is capable of communicating and transferring data and/or control instructions over any suitable wired or wireless network. For example, the mobile device 102 may be connected to the Internet via a WiFi network for the purpose of communicating and transferring data and/or control instructions over the Internet.

The system 100 further includes acquirer 132 which is in communication with merchant/value-add operator 130. The acquirer 132 is in communication with payment processing network 134 and as was described, may exchange data with payment processing network 134 as part of the transaction authorization process. The payment processing network 134 is also in communication with issuer 136. As was described, the issuer 136 may exchange data with the payment processing network 134 as part of an authentication, transaction authorization, or transaction reconciliation process.

The system 100 may also include a mobile gateway 138, which is capable of coupling the cellular (wireless) network or system to a second network (typically a wireline network such as the Internet) and enabling the transfer of data between the networks. The mobile gateway 138 may perform data processing operations as needed to permit the efficient transfer of data between the two types of networks, including, but not limited to, data reformatting or other processing to take into account differences in network protocols. The mobile gateway 138 may also perform data processing operations to enable more efficient data transfer between the networks and devices coupled to each type of network, such as for purposes of improving the ability of a consumer to utilize the received data on a mobile device. As shown in the figure, in some embodiments, the mobile gateway 138 is coupled to the payment processing network 134, which is coupled to the acquirer 132. Note that other embodiments are possible, such as where the mobile gateway 138 is coupled to the issuer 136, as well as where the acquirer 132 is coupled to issuer 136 and/or the merchant/ value-add operator 130. Similarly, issuer 136 may include the capability of functioning as the mobile gateway 138.

The system 100 provides, among other things, a way for a consumer to conduct a payment transaction during which the payment application 109 exchanges data with the value- add application(s) 111 via the trusted interface(s) 113. This reduces (and in some cases may prevent) the need for back-end server processing of data that may be relevant to both a payment transaction and to a function of the value- add application. As will be described, use of the system 100 may enable a payment processor, such as the payment processing network 134, or other entity, such as the issuer 136, responsible for managing the payment application 109 to extend the data processing services it provides to the value-add application(s) 111 and the operators, such as transit systems and loyalty program operators, of certain value-add programs. This may enable new services or products for consumers as well as more efficient transactions in which payment transaction data and value-add application data are utilized.

Figure 3:
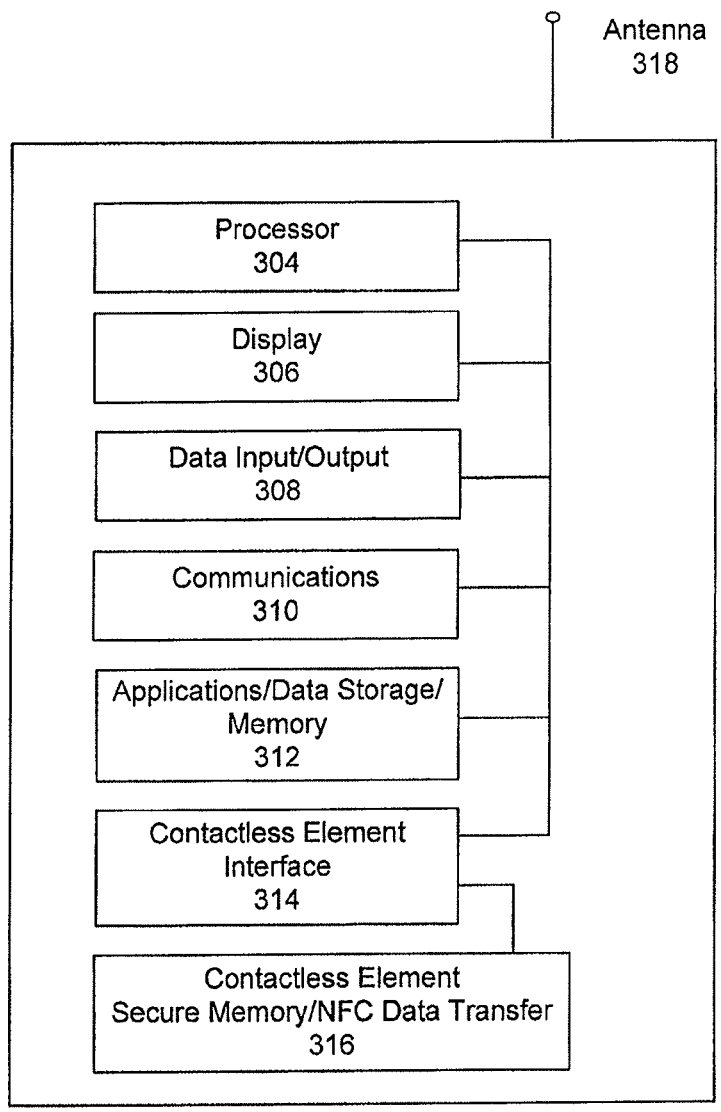
FIG. 3 is a functional block diagram illustrating the primary components of a mobile device, such as a mobile phone, that may be used as part of the inventive system and method, in accordance with some embodiments of the present invention.

In embodiments of the present invention, the mobile payment device may include a contactless element capable of communication and data transfer using a near field communication system. As noted, one example is a mobile wireless phone equipped with a NFC capability or other short range communications technology. FIG. 3 is a functional block diagram illustrating the primary components of a mobile device (e.g., element 102 of FIG. 2), such as a mobile phone that may be used as part of the inventive system and method. As illustrated in FIG. 3, the mobile device 302 may include circuitry that is used to enable certain telephony and other device functions. The functional elements responsible for enabling those functions may include a processor 304 for executing instructions that implement the functions and operations of the device. The processor 304 may access data storage 312 (or another suitable memory region or element) to retrieve instructions or data used in executing the instructions. Data input/output elements 308 may be used to enable a user to input data (via a microphone or keyboard, for example) or receive output data (via a speaker, for example). Display 306 may also be used to output data to a user. Communications element 310 may be used to enable data transfer between the device 302 and a wireless network (via antenna 318, for example) to assist in enabling telephony and data transfer functions. As described with reference to FIG. 2, the device 302 may also include contactless element interface 314 to enable data transfer between contactless element 316 and other elements of the device, where the contactless element 316 may include a secure memory and a near field communications or other short range communications data transfer element. The contactless element 316 may implement a near field communications or other short range communications capability that enables communication and data transfer between the device 302 and a device reader or POS terminal that is part of a payment transaction processing system.

The data storage 312 may be a memory that stores data, and may be in any suitable form including a memory chip, etc. The memory may be used to store payment data such as user identification or authentication information, user account information, transaction data, etc. Stored payment data may also include information such as bank/payment account information, bank identification number (BIN), credit or debit card account number information, account balance information, expiration date, consumer information such as name, date of birth, etc. The memory may also be used to store value-add data such as transit data and loyalty program data. Such transit data may include, for example, transit account information, trip counters, fare conversion information, account balance information, etc. Such loyalty program data may include loyalty account information, loyalty points/credits, account balance, loyalty program rules, terms, and conditions, user preferences, etc. Note that such data may instead, or also be stored in a secure data storage element, such as secure data storage 110 of FIG. 2 or a similar secure memory that is part of contactless element 316. As described, data storage 312 may also contain instructions which when executed by the processor 304 implement operations or processes that are part of the operation of the device or of applications installed on the device.

Figure 4:
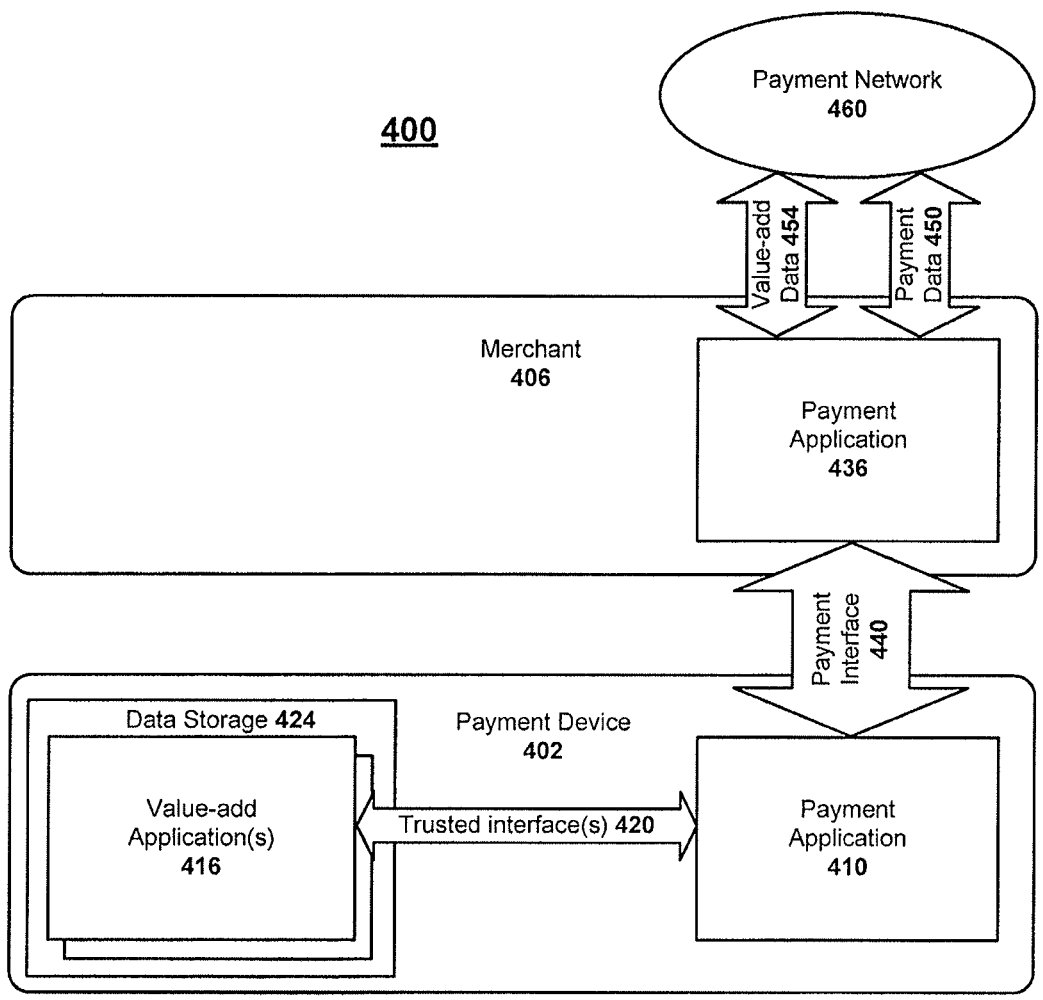
FIG. 4 is a block diagram of elements that may be present in a payment device that includes a value-add interface between a payment application and value-add applications within the payment device, in accordance with some embodiments of the present invention.

FIG. 4 is a functional block diagram illustrating the primary components of a system 400 for using a payment device to conduct payment transactions in which payment and value-add applications installed on the payment device exchange data via an interface, in accordance with some embodiments of the present invention. As shown in FIG. 4, the system 400 includes a mobile payment device 402 and a merchant 406. The mobile payment device 402, according to an embodiment, may be the mobile device 102 of FIG. 2 or the mobile 302 of FIG. 3. Also, according to an embodiment, the mobile payment device 402 may be a card, such as a smart card with an embedded chip that communicates with a point of sale terminal or device reader using a contact or contactless mode.

A payment application 410 and one or more value-add applications 416 are installed on the payment device 402. One or more value-add interfaces 420 are installed on the payment device for coupling the payment application 410 to the value-add applications 416. According to an embodiment, one value-add interface 420 is provided for each value-add application 416 installed on the payment device 402. According to the illustrated embodiment, the value-add applications 416 are stored in data store 424. When a payment transaction is required, the payment transaction may be performed offline by the payment application 410 within the payment device 402 or the payment application 410 may send payment data (e.g, ARQC and PAN) through a merchant acceptance device (e.g., a transit ticket validator) to the merchant (e.g., a transit operator), which can then get online authorization. The data store 424 may be, for example, the secure data storage element 110 or 114 of the mobile payment device 102 or the data storage 312 of the mobile payment device 302 of FIGS. 2 and 3, respectively. The merchant 406 includes a payment application 436 configured to receive payment data and value-add data from the payment application 410 of the payment device via a payment interface 440.

According to an embodiment, the payment application 436 of the merchant 406 is installed on an acceptance device or terminal that is associated with the merchant 406 and that collects payment data and value-add data from the payment device 402 via contactless payment transactions and card swipe transactions. According to this embodiment, the payment interface 440 may be a contactless element interface, such as contactless element 106 of FIG. 2 which functions to permit the exchange of data and/or control instructions between the payment application 410 of the payment device 402 and the payment application 436 of the merchant 406.

According another embodiment, the payment application 436 of the merchant 406 is installed on an application server that is provided in communication with a network, such as the network 120 (e.g., a wireless network or the Internet) and/or the payment processing network 134 of FIG. 2. According to this embodiment, the payment interface 440 may be configured to permit the exchange of data and/or control instructions between the payment application 410 of the payment device 402 and the payment application 436 of the merchant 406 over a network such as the Internet, where the payment device is located in a remote location relative to the merchant. In transactions of this type, the payment device 402 may be a cell phone, personal data assistant (PDA), or a personal computer that communicates with a merchant directly or indirectly over the network. These types of transactions, where the consumer is not in the same physical location as a merchant, and hence where a payment device is not physically presented to the merchant, are sometimes referred to as "mobile" and/or "card not present" transactions.

As illustrated in FIG. 4, the payment application 436 of the merchant 406 is configured to send both payment data 450 and value-add data 454 to a payment network 460, such as the payment processing network 134 of FIG. 2.

Figure 5:
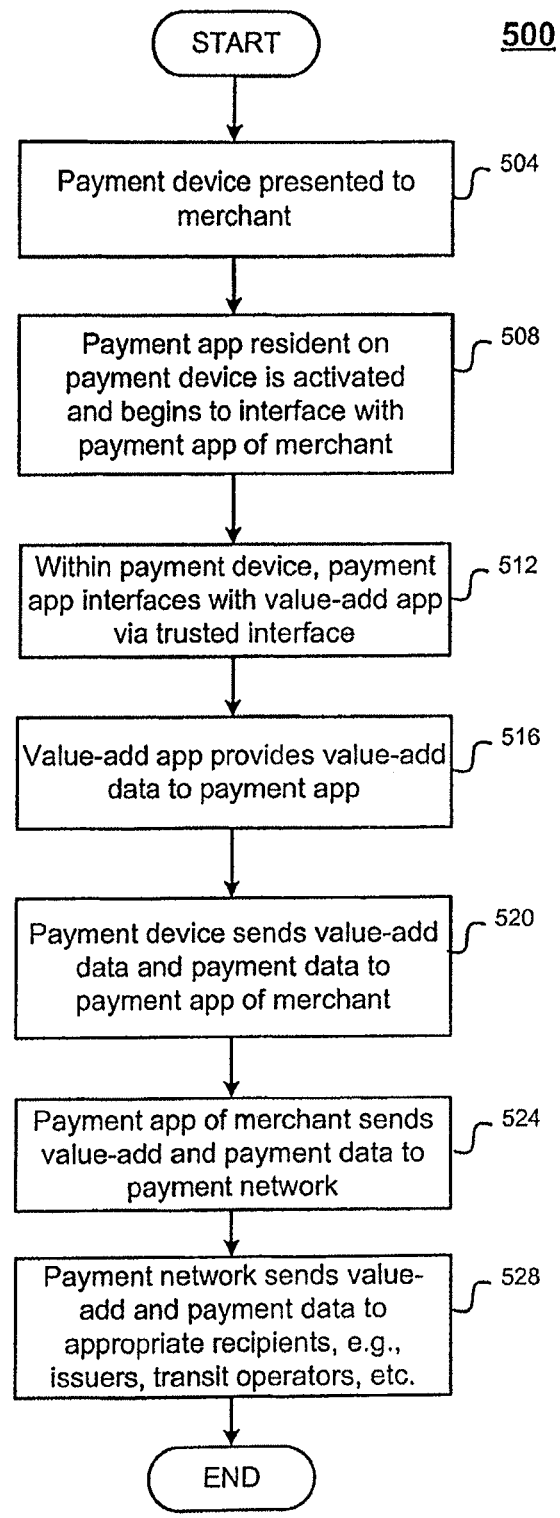
FIG. 5 is a flow chart illustrating an embodiment of an inventive method or process for performing a transaction where the payment device of FIG. 4 is used to conduct the transaction, in accordance with some embodiments of the present invention.

FIG. 5 is a flow chart illustrating an embodiment of an inventive method or process 500 for performing a transaction where the payment device of FIG. 4 is used to conduct the transaction, in accordance with some embodiments of the present invention. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in FIG. 5, at 504 the payment device 402 is presented to the merchant 406. According to an embodiment, at 504 a consumer presents the payment device 402 to a device reader or point of sale (POS) terminal of the merchant 406. The payment device 402 may be a mobile device that includes a contactless element such as a contactless chip. Typically, the consumer presents the mobile device to the device reader or POS terminal as part of providing data to initiate or participate in a payment transaction. According to another embodiment, at 504 a consumer may present the payment device 402 to the merchant 406 by engaging the merchant 406 in a mobile payment transaction over a cellular network or the Internet, or some other type of "card not present" transaction.

At 508, presentation of the payment device 402 activates or "launches" the payment application 410 installed on the payment device 402, and the payment application 410 of the payment device 402 begins to transact with the payment application 436 of the merchant 406. According to an embodiment, activation of the payment application 410 may be accomplished by causing communication between a device reader or POS terminal of the merchant 406 and the payment device 402. For example, such activation may occur as the result of the device reader or POS terminal transferring data or a command to the payment device 402 (such as by performing the equivalent of a key or softkey activation), either automatically or in response to a consumer selecting a payment application icon on a device reader or POS terminal screen, for example. According to another embodiment, activation of the payment application 410 may be accomplished by causing communication between the payment application 436 of the merchant 406 and the payment application 410 of the payment device 402 in the course of a mobile payment transaction over a cellular network or the Internet, or some other type of "card not present" transaction.

Note that the activation of the payment application 410 at this stage is optional, and may be implemented at a different stage in the process 500. Further, depending upon the operation of the process 500 depicted in FIG. 5, activation of the payment application 410 may or may not be required in order to implement one or more of the other stages of the overall process. For example, in some embodiments, the payment application 410 may need to be activated in order for certain of the later stages to be implemented, or for consumer authentication data to be transferred to a device reader or POS terminal of the merchant 406. Similarly, in some embodiments, the consumer authentication data may be able to be transferred without activation of the payment application 410, or the need for interaction with the payment device 402 or consumer may be able to be detected in the absence of an activated payment application.

According to an embodiment, upon activating the payment application 410, it could be determined if interaction (such as a consumer input or action) is required prior to conducting or completing the payment transaction. For example, based on identifying the consumer, the consumer's payment account, etc., it may be determined whether interaction with the consumer's payment device 402 or the consumer is required prior to proceeding with a payment transaction. If interaction with the payment device 402 is not required to proceed with a payment transaction, then the payment transaction may be performed; note that in some embodiments, the user may be asked to present the payment device 402 in order to permit performance of the payment transaction, as the first presentment of the payment device (at 504) served to activate the payment application (as shown at 508). However, if interaction with the payment device 402 or consumer is required before proceeding with a payment transaction, then this interaction is implemented. The required interaction may involve the consumer providing certain data (such as a passcode or other authentication data, or responding to a challenge question), or the performance of an operation on the payment device 402. Thus, if required, the interaction is performed and the payment device is re-presented to the device reader or point of sale terminal to perform the payment transaction, for example. As mentioned, the interaction may involve a consumer providing data (such as a password, etc.), or the payment device or payment application being configured to permit execution of a payment transaction.

At 512, the payment application 410 of the payment device 402 sends a request, via the trusted value-add interface 420, to the value-add application 416 to provide value-add data 454 that is relevant to the transaction. For example, during the transaction, the payment application 410 refers to the value-add application 416, e.g. a transit or loyalty application, sitting in the same payment device 402 and communicates with the value-add application 416 through the internal value-add interface 420. The communication, for example, may interrogate the value-add application 416 regarding the availability of loyalty points or rides or other value-add data 454. For example, upon receiving the request from the payment application, the value-add application makes a value-add calculation based on the payment transaction data and sends the results of the calculation to the payment application via the trusted value-add interface 420. For example, the value-add calculation may determine the number of transit rides remaining on the payment device or the amount of loyalty points/credits remaining on the payment device and a determination of how, if at all, the transit rides or loyalty points/credits affect the payment transaction. For example, if the consumer has loyalty points or transit rides, then those points or rides may be applied to reduce the cost of the transaction. Then, the payment application sends the value-add data together with payment data to a payment processing network, which may send the data to an issuer bank, an acquirer bank, the value-add operator, etc.

At 516, the value-add application 416 sends value-add data 454 to the payment application 410 via the value-add interface 420. At 520, the payment application 410 of the payment device 402 sends the value-add data 454 together with payment data 450 to the payment application 436 of the merchant 406 via the payment interface 440. According to an embodiment, the payment application 436 of the merchant 406 completes the transaction. However, according to other embodiments, the payment application 410 of the payment device 402 may complete the transaction offline. At 524, the payment application 436 of the merchant sends the value-add data 454 together with the payment data 450 to the payment network 460. At 528, the payment network 460 routes the payment and value-add data 450, 454 to the appropriate recipients, such issuing banks, transit operators, loyalty operators and so on.

Figure 6:
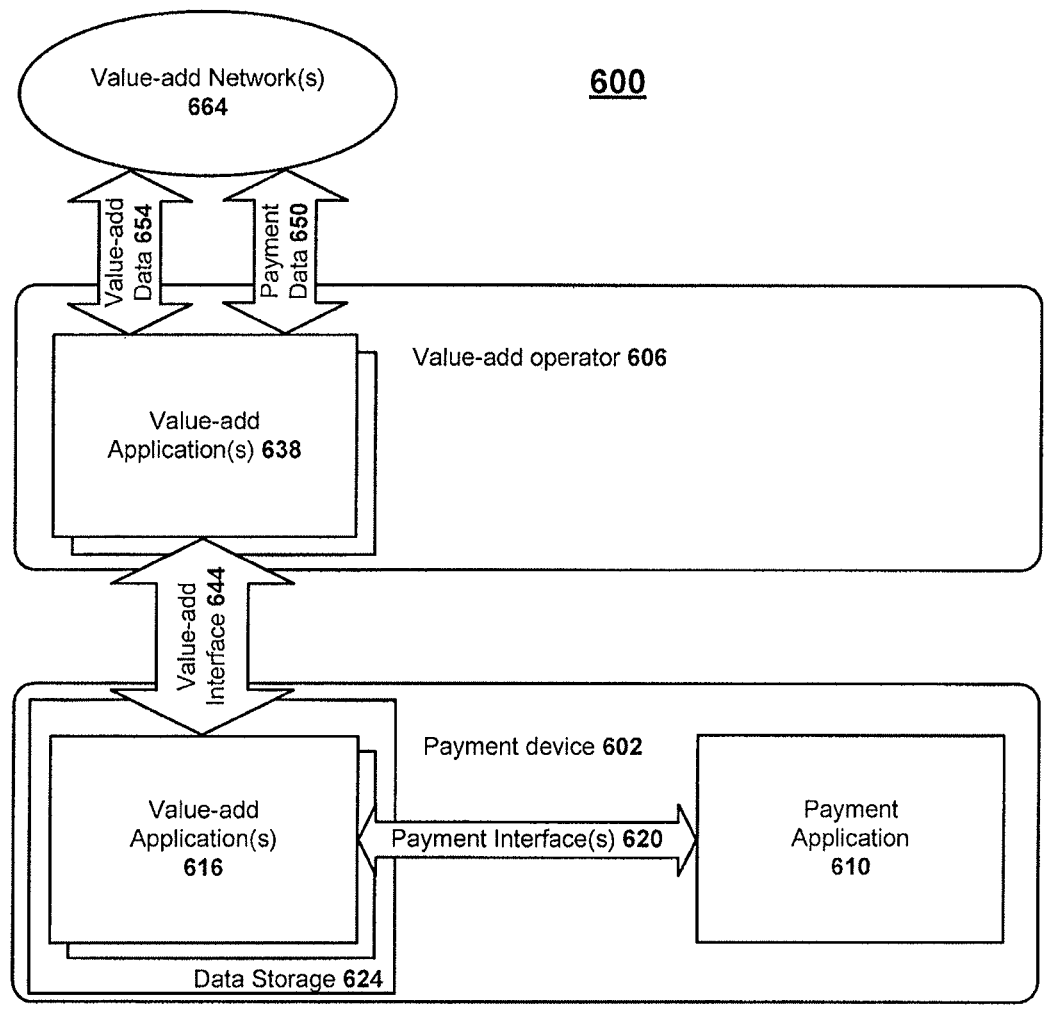
FIG. 6 is a block diagram of elements that may be present in a payment device that includes a payment interface between a payment application and value-add applications within the payment device, in accordance with some embodiments of the present invention.

FIG. 6 is a functional block diagram illustrating the primary components of a system 600 for using a payment device to conduct value-add transactions in which payment and value-add applications installed on the payment device exchange data via an interface, in accordance with some embodiments of the present invention. As shown in FIG. 6, the system 600 includes a mobile payment device 602 and a value-add operator 606. The mobile payment device 602, according to an embodiment, may be the mobile device 102 of FIG. 2, device 302 of FIG. 3, or device 402 of FIG. 4. Also, according to an embodiment, the mobile payment device 602 may be a card, such as a smart card with an embedded chip that communicates with a terminal or device reader of a value-add operator using a contact or contactless mode.

A payment application 610 and one or more value-add applications 616 are installed on the payment device 602. One or more payment interfaces 620 are installed on the payment device for coupling the payment application 610 to the value-add applications 616. According to an embodiment, one payment interface 620 is provided for each value-add application 616 installed on the payment device 602. According to the illustrated embodiment, the value-add applications 616 are stored in data store 624. It should be appreciated that the payment device 602, the data storage 624, and the payment and value-add applications 610 and 616 may be the same as the corresponding elements of FIG. 4. According to FIG. 6, the value-add operator 606 includes one or more value-add applications 638 configured to receive value-add data and payment data from the one or more value-add applications 616 of the payment device 602 via a value-add interface 644.

According to an embodiment, the one or more value-add applications 638 of the value-add operator 606 are installed on an acceptance device or terminal, such as a transit validator or a loyalty terminal, that collects value-add data and, optionally, payment data from the payment device 602 via contactless transactions and card swipe transactions. According to this embodiment, the value-add interface 644 may be a contactless element interface, such as the contactless element 106 of FIG. 2 which functions to permit the exchange of data and/or control instructions between the one or more value-add applications 616 of the payment device 602 and the one or more value-add applications 638 of the value-add operator 606.

According another embodiment, the one or more value-add applications 638 of the value-add operator 606 are installed on an application server that is provided in communication with a network, such as the network 120 (e.g., a wireless network or the Internet) and/or the payment processing network 134 of FIG. 2. According to this embodiment, the value-add interface 644 may be configured to permit the exchange of data and/or control instructions between the one or more value-add applications 616 of the payment device 602 and the one or more value-add applications 638 of the value-add operator 606 over a network, such as the Internet or cellular network, where the payment device 602 is located in a remote location relative to the value-add operator 606. In these remote transactions, the payment device 602 may be a cell phone, personal data assistant (PDA), or a personal computer that communicates with a value-add operator 606 directly or indirectly over a network. These types of transactions, where the consumer is not in the same physical location as a value-add operator, and hence where a payment device is not physically presented to the value-add operator, are sometimes referred to as "mobile" and/or "card not present" transactions.

As illustrated in FIG. 6, the one or more value-add applications 638 of the value-add operator 606 are configured to send both payment data 650 and value-add data 654 to one or more corresponding value-add proprietary networks 664, such as a transit network or a loyalty program network.

Figure 7:
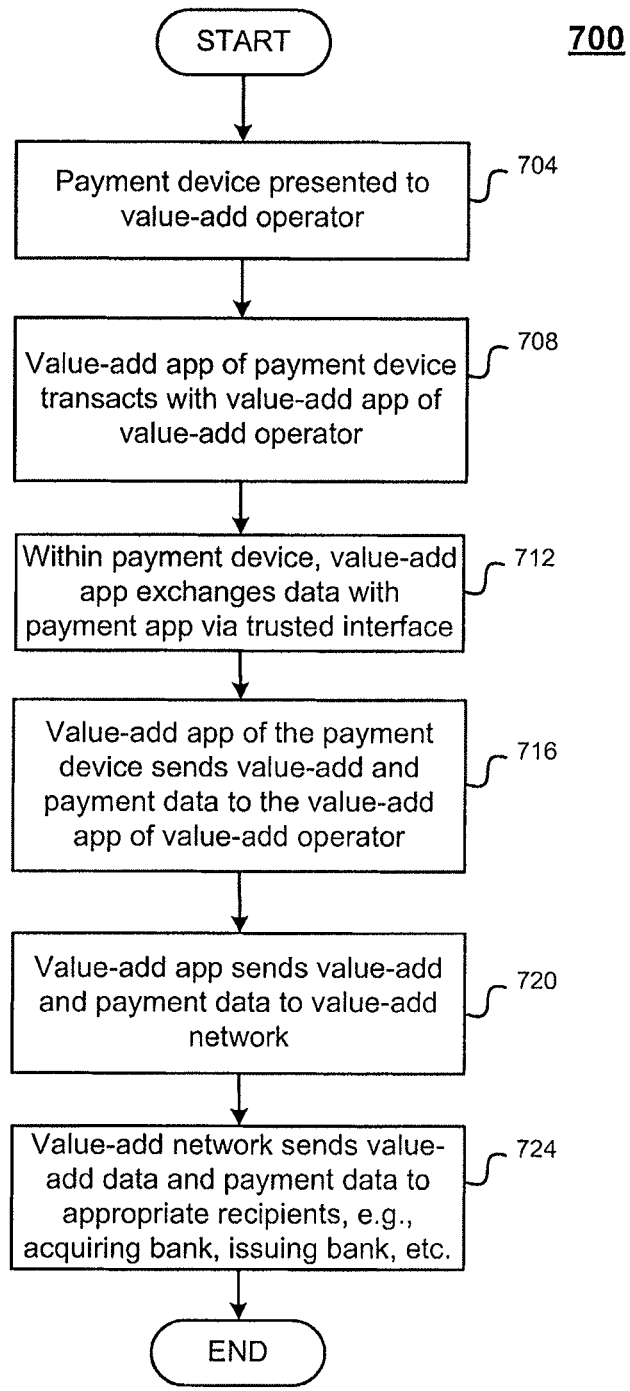
FIG. 7 is a flow chart illustrating an embodiment of an inventive method or process for performing a transaction where the payment device of FIG. 6 is used to conduct the transaction, in accordance with some embodiments of the present invention.

FIG. 7 is a flow chart illustrating an embodiment of an inventive method or process 700 for performing a transaction where the payment device 602 of FIG. 6 is used to conduct a value-add transaction, in accordance with some embodiments of the present invention. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in FIG. 7, at 704 the payment device 602 is presented to the value-add operator 606. According to an embodiment, at 704 a consumer presents the payment device 602 to a value-add operator 606. The payment device 602 may be a mobile device that includes a contactless element such as a contactless chip. Typically, the consumer presents the mobile device to the device reader or POS terminal as part of providing data to initiate or participate in a payment transaction. According to another embodiment, at 704 a consumer may present the payment device 602 to the value-add operator 606 by engaging the value-add operator 606 in a mobile value-add transaction over a cellular network or the Internet.

At 708, presentation of the payment device 602 activates or "launches" the appropriate value-add application 616 installed on the payment device 602, and the value-add application 616 of the payment device 602 begins to transact with the value-add application 638 of the value-add operator 606. According to an embodiment, activation of the value-add application 616 may be accomplished by causing communication between the value-add application 638 of a device reader or terminal of the value-add operator 606 and the payment device 602. For example, a transit value-add application 616 on the payment device 602 may be activated when the payment device 602 is presented to a transit ticket validator of a transit operator 606. According to another embodiment, activation of the value-add application 616 may be accomplished by causing communication between the value-add application 638 of the value-add operator 606 and the value-add application 616 of the payment device 602 in the course of a value-add transaction over a cellular network or the Internet.

Note that, as mentioned above with respect to process 500, the activation of the value-add application 616 at this stage is optional, and may be implemented at a different stage in the process 700, and, depending upon the operation of the process 700 depicted in FIG. 7, activation of the value-add application 616 on the payment device 606 may or may not be required in order to implement one or more of the other stages of the overall process.

At 712, the activated value-add application 616 installed on the payment device 602 exchanges data via the appropriate payment interface 620 with the payment application 610 that is also installed on the payment device 602. For example, the activated value-add application 616 of the payment device 602 sends a request, via the appropriate trusted payment interface 620, to the payment application 610. The request may instruct the payment application 610 to send payment data 650 that is relevant to the value-add transaction to the value-add application 616 via the payment interface 620. For example, the payment data may include data needed to complete an online authorization such as the ARQC cryptogram, payment account number, expiry date, etc. Such payment data may be sufficient for the payment application 610 in the payment device 602 to perform a payment transaction within the payment device 602 offline or with further online authorization. Both the value-add application 616 and the payment application 610 decide whether the transaction can be performed offline within the payment device 602 or online with online authorization. Further, for example, the payment data may be a confirmation of payment (offline authorization) needed to reset counter of a transit value-add application 616 or replenish loyalty points of a loyalty value-add application 616. The value-add transaction may be, for example, a loyalty point redemption, transit ticket validation, and so on. For example, during a value-add transaction to purchase or otherwise acquire transit rides, a transit application 616 refers to the payment application 610, sitting in the same payment device 602, and communicates with the payment application 610 through the internal payment interface 620. The communication, for example, may instruct the payment application 610 to provide payment data that may be used to request payment for transit rides that are being acquired via the value-add transaction.

At 716, the value-add application 616 of the payment device 602 sends the value-add data 654 together with payment data 650 to the value-add application 638 of the value-add operator 606 via the value-add interface 644. It should be appreciated that the transaction may be complete locally on the value-add application 616 of the payment device 602 or on the value-add application 638 of the value-add operator 606. At 720, the value-add application 638 of the value-add operator 606 sends the value-add data 654 together with the payment data 650 to the value-add network 664. At 724, the value-add network 664 sends the value-add data 654 and the payment data 650 to, for example, acquiring banks (to get online authorization from issuers), transit operators, loyalty operators, and so on.

Figure 8:
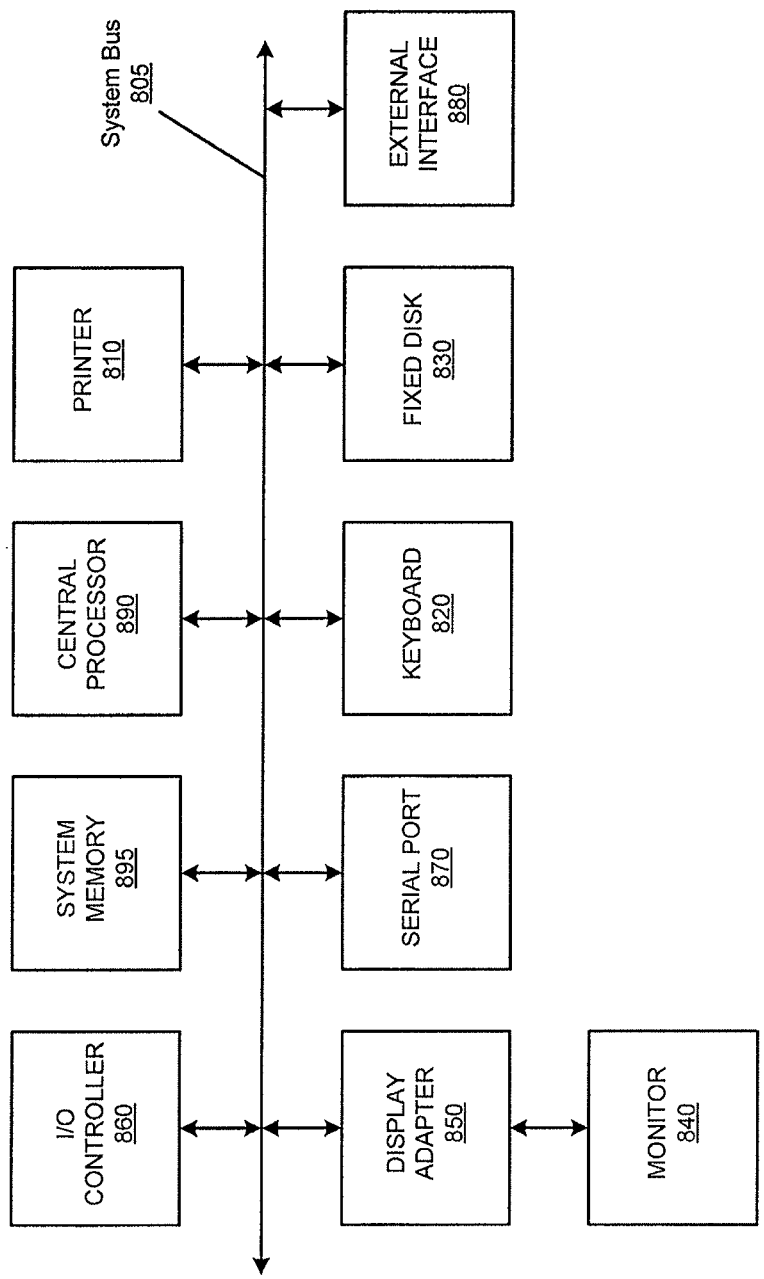
FIG. 8 is a functional block diagram illustrating the primary components of a system, in accordance with some embodiments of the present invention.

FIG. 8 shows a block diagram of an exemplary computer apparatus that can be used in some embodiments of the invention (e.g., in any of the components shown in the prior Figures).

The subsystems shown in FIG. 8 are interconnected via a system bus 805. Additional subsystems such as a printer 810, keyboard 820, fixed disk 830 (or other memory comprising computer readable media), monitor 840, which is coupled to display adapter 850, and others are shown. Peripherals and input/output (I/O) devices, which couple to I/O controller 860, can be connected to the computer system by any number of means known in the art, such as through serial port 870. For example, serial port 870 or external interface 880 can be used to connect the computer apparatus to a wide area network such as the Internet, a mouse input device, or a scanner. The interconnection via system bus 805 allows the central processor 890 to communicate with each subsystem and to control the execution of instructions from system memory 895 or the fixed disk 830, as well as the exchange of information between subsystems. The system memory 895 and/or the fixed disk 830 may embody a computer readable medium.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein. For example, although some specific embodiments describe the use of a message conversion process with typical brick and mortar type merchants, embodiments of the invention can also be used in on-line e-commerce type transactions.

Embodiments of the invention are not limited to the above-described embodiments. For example, although separate functional blocks are shown for an issuer, payment processing system, and acquirer, some entities perform all of these functions and may be included in embodiments of invention.

Further, additional embodiments of the invention may be directed to methods and systems involving merchants, and their access devices, as well as issues. For example, other embodiments may include the following additional embodiments.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a transaction module installed on a transaction device, transaction data and application data associated with a user of the transaction device;
receiving, at the transaction module, via an interface that couples the transaction module to an application that is installed on the transaction device and that is configured to enable transactions, a request to facilitate a transaction between the user of the transaction device and a service provider; and
transmitting, by the transaction module, to a reader device of the service provider the transaction data and the application data that are associated with the user of the transaction device.

2. The method of claim 1, wherein the transaction data and the application data are transmitted together in a message sent from the transaction device to the reader device.

3. The method of claim 1, wherein the transaction data and the application data are transmitted via a communications interface of the transaction device.

4. The method of claim 1, wherein the application data is transmitted to the application to obtain adjusted transaction information for the transaction.

5. The method of claim 4, wherein the application data is transmitted to the application via a network.

6. The method of claim 4, wherein the service provider transmits the transaction data and the adjusted transaction information to a processing network.

7. The method of claim 1, wherein the transaction device is a mobile device.

8. The method of claim 7, wherein the transaction between the user of the transaction device and the service provider is conducted using a near field communications technology.

9. The method of claim 1, wherein the application data comprises value-add data.

10. A method comprising:
receiving, at an application that is installed on a transaction device and that is configured to enable transactions, an instruction to facilitate a transaction between a user of the transaction device and a service provider; and
transmitting, from the application to a transaction module that is also installed on the transaction device via an interface that couples the application and the transaction module, a request that causes the transaction module to facilitate the transaction by sending, to a reader device of the service provider, transaction data associated with an account of the user.

11. The method of claim 10, wherein the transaction module transmits application data together with the transaction data.

12. The method of claim 11, wherein the application data is transmitted to the application to obtain adjusted transaction information for the transaction.

13. The method of claim 12, wherein the application data is transmitted to the application via a network.

14. The method of claim 12, wherein the service provider transmits the transaction data and the adjusted transaction information to a processing network.

15. A method comprising:
receiving, at an application that is installed on a transaction device and that is managed by or on behalf of a service provider, an instruction to facilitate a transaction between a user of the transaction device and the service provider associated with the application;
transmitting, from the application to a transaction module that is also installed on the transaction device via an interface that couples the application and the transaction module, a request that causes the transaction module to return to the application transaction data associated with an account of the user; and
transmitting, from the application to a service provider, via a network that couples the application and the service provider, the transaction data and application data to enable the service provider to complete the transaction between the user and the service provider.

16. The method of claim 15, wherein the application data enables the service provider to determine a transaction amount.

17. The method of claim 16, wherein the service provider transmits the transaction amount and the transaction data to a processing network to complete the transaction.

18. The method of claim 16, wherein the application data enables the service provider to identify a product or service that the user is purchasing.

19. The method of claim 18, wherein the application data includes a purchase amount for the product or service.

20. The method of claim 15, wherein the transaction device is a mobile device.

\* \* \* \* \*